United States Patent [19]
Boehm et al.

[11] Patent Number: 5,363,748
[45] Date of Patent: Nov. 15, 1994

[54] ELECTRICAL COOKER

[75] Inventors: Michael W. Boehm, Batavia; Robert W. Johnson, Naperville, both of Ill.

[73] Assignee: Tsann Kuen USA, Inc., Naperville, Ill.

[21] Appl. No.: 5,232

[22] Filed: Jan. 15, 1993

[51] Int. Cl.[5] .............................................. A47J 37/00
[52] U.S. Cl. ........................................ 99/372; 99/375;
   99/415; 99/379; 219/401; 126/369; 126/20
[58] Field of Search .................. 99/372, 375, 379, 389,
   99/400, 410, 415, 417, 418, 467, 473; 219/401,
   524, 525, 415; 126/369, 20

[56] References Cited

U.S. PATENT DOCUMENTS

| | | | |
|---|---|---|---|
| 1,929,166 | 10/1933 | Freemon | 99/379 |
| 2,040,369 | 5/1936 | Fischer | 99/375 |
| 2,127,658 | 8/1938 | Walterspiel | 219/35 |
| 2,719,211 | 9/1955 | Lewis et al. | 219/401 |
| 3,010,383 | 3/1959 | Greene | 99/332 |
| 3,068,778 | 12/1962 | Majerus | 99/375 |
| 3,713,379 | 1/1973 | Gordy | 99/349 |
| 3,824,916 | 7/1974 | Green et al. | 99/334 |
| 3,963,898 | 6/1976 | Tuckwell | 99/375 |
| 3,972,318 | 8/1976 | Lenoir | 99/400 |
| 4,011,431 | 3/1977 | Levin | 99/375 |
| 4,075,939 | 2/1978 | Horn et al. | 99/345 |
| 4,094,295 | 6/1978 | Boswell et al. | 99/446 |
| 4,506,598 | 3/1985 | Meister | 99/330 |
| 4,508,024 | 4/1985 | Perkins | 99/340 |
| 4,694,816 | 9/1987 | Fabbro | 99/444 |
| 4,762,058 | 8/1988 | Masel et al. | 99/425 |
| 4,987,827 | 1/1991 | Marquez | 99/375 |

*Primary Examiner*—David A. Scherbel
*Assistant Examiner*—Reginald L. Alexander
*Attorney, Agent, or Firm*—Welsh & Katz, Ltd.

[57] ABSTRACT

A cooking device including a upper unit having an upper grilling plate hingeably attached to a lower unit having a lower grill plate. The upper unit movable relative to the lower unit from an open position to a closed position to form an enclosed cooking chamber to cook foodstuffs. The lower grill plate includes a well to contain liquid and a heating unit for heating the well to vaporize the liquid during cooking and supply vapor to the cooking chamber.

22 Claims, 6 Drawing Sheets

FIG. 1
FIG. 2
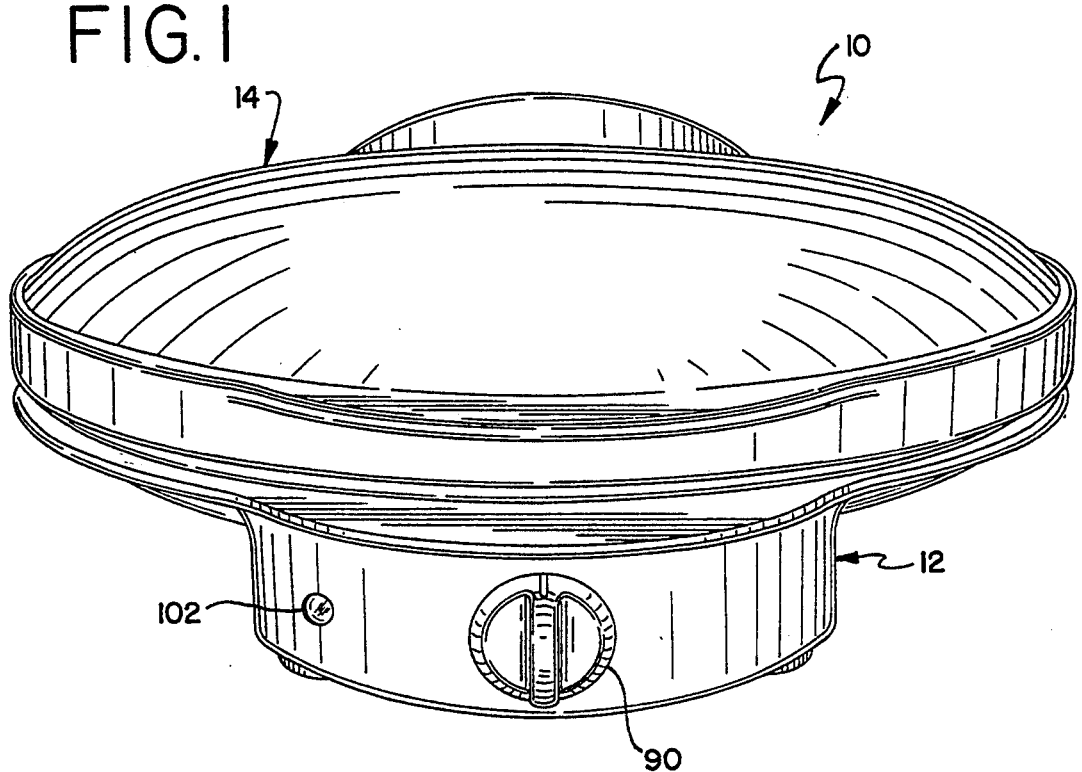
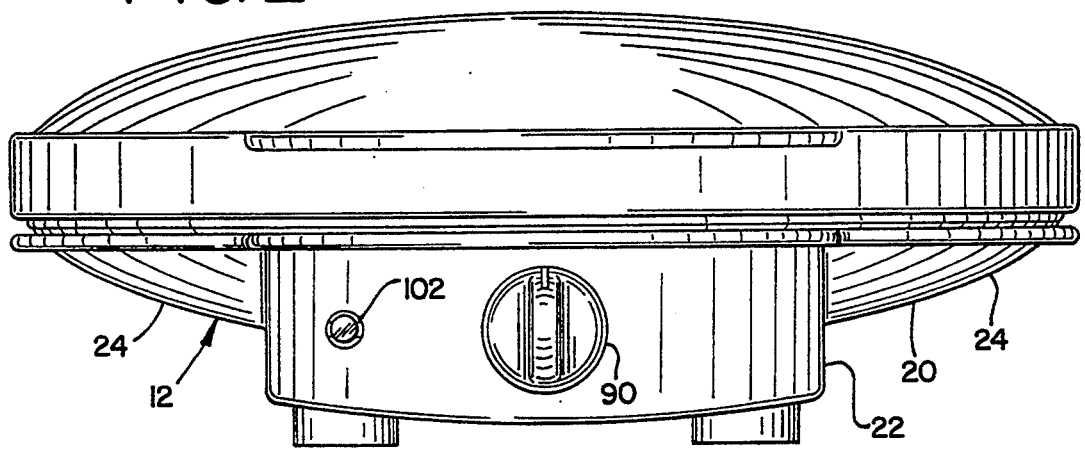

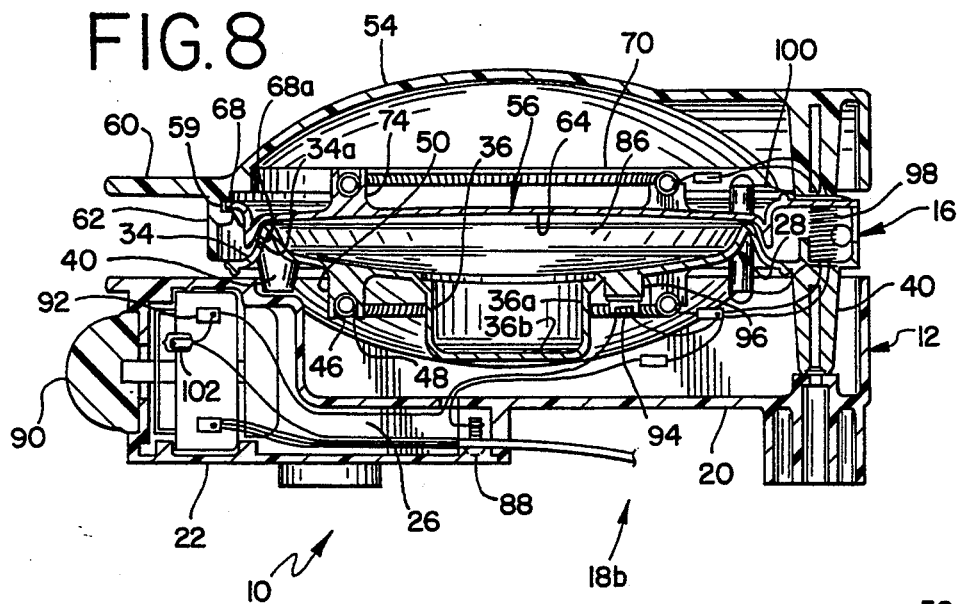
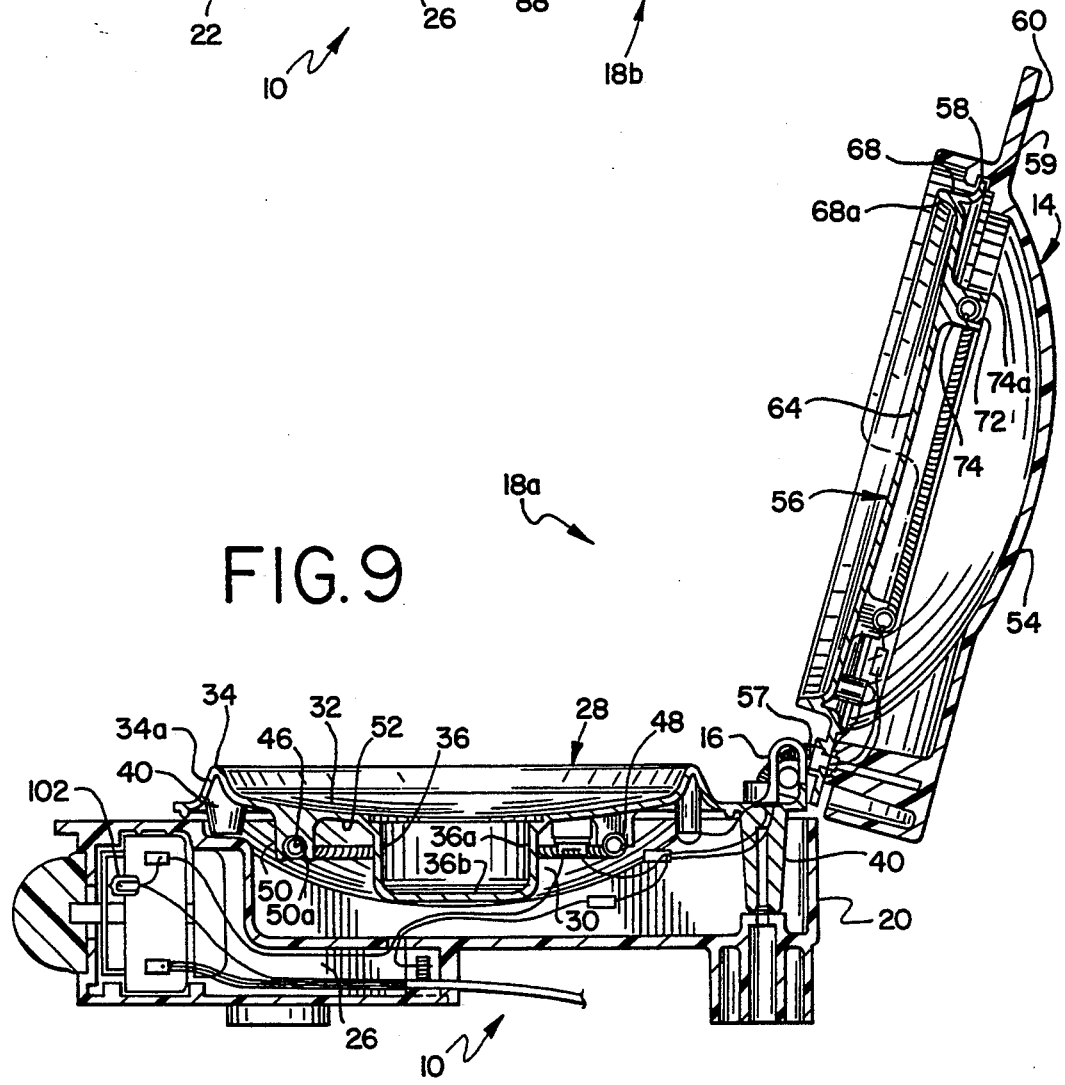

ELECTRICAL COOKER

BACKGROUND OF THE INVENTION

This invention relates to electrical cookers in general and more particularly to electrical cookers which quickly cook foodstuffs such as poultry breasts, fish and the like while imparting flavor to and preserving the moisture within the foodstuffs.

Due to health concerns, there is a desirability to cook foods without the use of cooking oils, fats or similar substances. One method of preparing foods without such substances is by grilling the foods in a broiler. One of the disadvantages of this method is that the foods tend to loose moisture during the grilling resulting in poor taste. A second disadvantage is that the grilling does not add flavor to the foodstuffs, and thus to impart flavor, seasonings must be added to the surface of the food.

A cooker for foods is discussed in U.S. Pat. No. 4,094,295. The claimed device cooks the foodstuffs in a smoker chamber having a pan of water between the charcoal heating elements and the foods being cooked. Although this smoker device flavors the food and preserves its moisture content, the cooking takes several hours which is a significant disadvantage. An additional disadvantage is that this device may give off noxious gases, which necessitates that the device be used outdoors.

It is therefore an object of the present invention to provide a device which cooks foodstuffs without the need for oils, fats and similar substances.

It is another object of the present invention to provide a device which cooks foodstuffs and maintains the moisture content of the food during the cooking thereof.

It is a further object of the present invention to provide a device which permits the introduction of flavor into the foodstuffs.

It is a still further object of the present invention to provide a device in which foods can be cooked indoors and can be easily used in a typical kitchen.

It is a still further object of the present invention to provide a device which cooks food quickly.

SUMMARY OF THE INVENTION

Accordingly, the present invention provides a cooking device for cooking foodstuffs having a lower cooking plate, and an upper cooking plate movable relative to the lower cooking plate to a closed position in which the upper and lower cooking plates form a cooking chamber which substantially restrains the escape of vapor therefrom. The lower cooking plate desirably has a well to contain liquid and a lower heating element to vaporize at least a portion of the liquid in the well to supply vapor to the cooking chamber during cooking.

More particularly, the upper cooking plate is heated by an upper heating element, and the lower heating element heats the lower cooking plate and the well. The upper and lower cooking plates include peripheral rims configured to contact each other in a shingled overlapping configuration to enclose the cooking chamber and substantially restrain the escape of vapor therefrom. The cooking device also includes a floating hinge element which provides pivotal movement of the upper cooking plate relative to the lower cooking plate. The hinge element also allows the relative vertical distance between the upper cooking plate and lower cooking plate to vary to accommodate foods of various thicknesses, with the overlapping configuration of the peripheral rims maintaining the enclosure of the cooking chamber.

BRIEF DESCRIPTION OF THE DRAWINGS

FIG. 1 is a frontal perspective view of the preferred embodiment of the device of the present invention;

FIG. 2 is a front elevation of the device of FIG. 1;

FIG. 8 is a sectional view taken along line 8—8 of FIG.

FIG. 9 is a sectional view of the device shown in FIG. 8 in an open position;

DESCRIPTION OF THE PREFERRED EMBODIMENT

Figure 3:
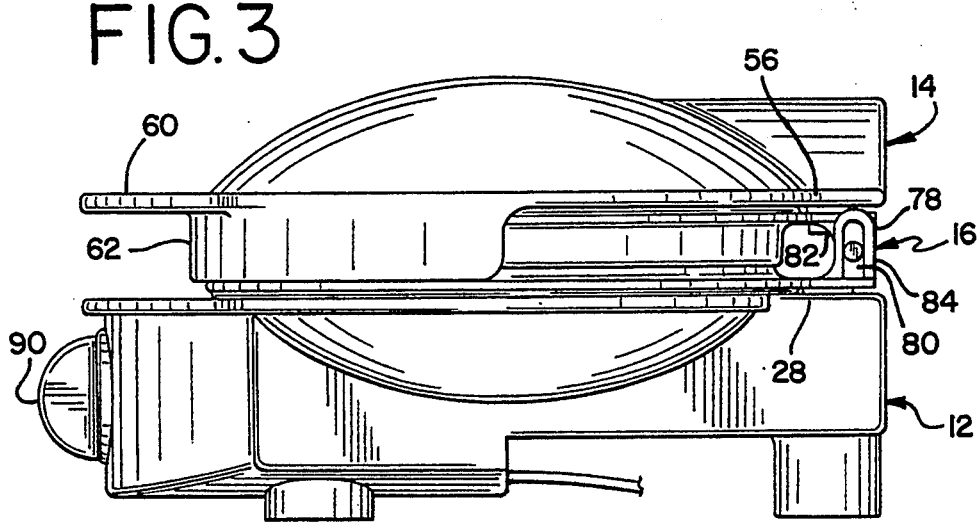
FIG. 3 is a right side elevation of the device of FIG. 1.
Figure 4:
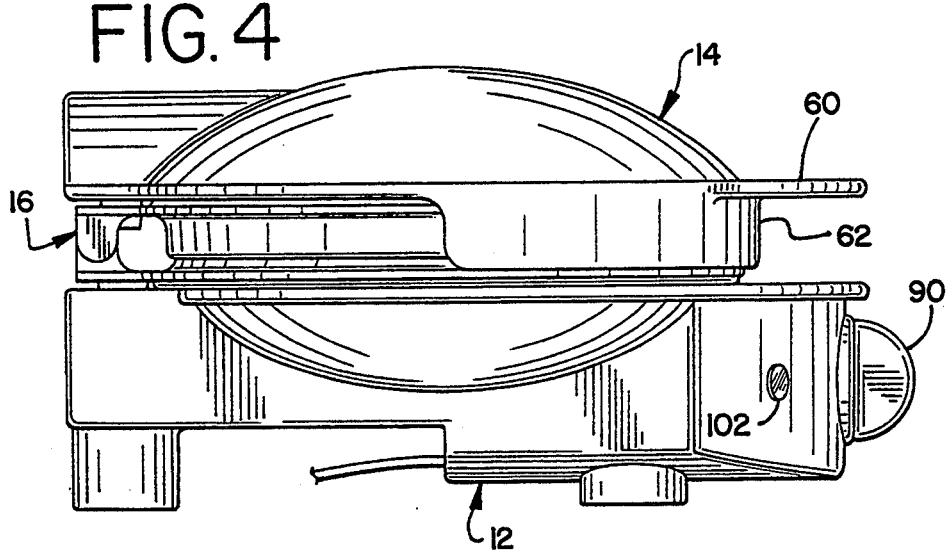
FIG. 4 is a left side elevation of the device of FIG. 1.

FIG. 1 illustrates a steamer cooker apparatus 10 constructed in accordance with the present invention. The apparatus 10 includes a base unit indicated at 12 and a upper unit indicated at 14. The base unit 12 and upper unit 14 are pivotally connected by a floating hinge indicated at 16 (FIG. 3) which allows the top unit to move vertically, and to be pivotally moved relative to the base unit 12 from an open position 18a (FIG. 9) to a closed position 18b (FIG. 8).

Referring to FIG. 2, the base unit 12 includes a lower housing 20 having a generally rectangular configured central control portion 22. The central portion 22 is disposed between two upward opening dish shaped lateral portions 24. Referring to FIGS. 8 and 9, the central portion 22 forms a forward control cavity 26 which houses the control elements for the cooker 10. A lower cooking plate indicated at 28 is secured to the top of the lower housing 20. The lower housing 20 and lower cooking plate 28 define a lower cavity 30.

The lower cooking plate 28 includes an upward opening, generally concave lower cooking surface 32, and forms a rim 34 about the oval shaped periphery of the lower cooking surface.

Within the peripheral rim 34, the lower cooking plate 28 forms a depressed containing well 36. The well 36 has a peripheral sidewall 36a with a generally circular shaped horizontal cross-section and a flat bottom surface 36b. The well 36 holds liquids which are to be heated to form vapor during the cooking of the food, and receives juices and oils given off by the food during cooking. Preferably, the lower cooking surface 32 is sloped and the well 36 is located at a position so that the juices given off by the foodstuffs during cooking will drain from the lower cooking surface into the well.

To rigidly secure the lower cooking plate 28 to the lower housing 20, the lower cooking plate includes four downwardly depending legs 40 which are secured, for example by being bolted (not shown) to the lower housing 20. The lower cooking plate 28 has a plurality of radially extending ribs 44 (FIG. 10) which support the foodstuffs and create grill marks on the foodstuffs during cooking.

The lower cooking surface 32 and well 36 is heated by heating of the lower plate 28, through the provision of a tubular heating element 46. The heating element 46 is positioned so as to conductively transfer heat to the lower plate 28 by disposing the heating element in a channel 48 formed in a downwardly depending flange 50 integral with the lower surface 52 of the lower plate. To provide efficient heat transfer from the heating element 46 to the lower plate 28, the channel 48 is configured to closely fit about a circumferential portion of the heating element. The heating element 46 is held within the channel 48 by deformation of the lower tips 50a of the flange 50 about lateral portions of the heating element.

Figure 11:
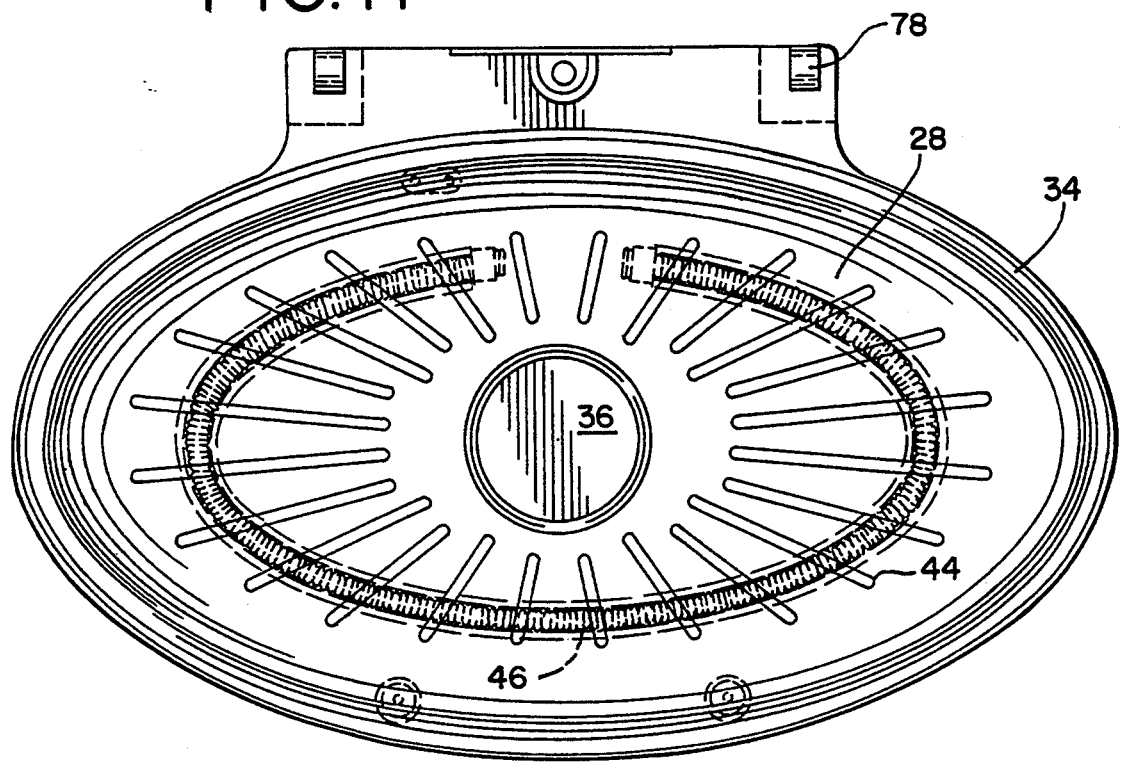
FIG. 11 is a top planar view of a base unit forming a portion of the device of FIG. 1.

Referring to FIG. 11, to evenly heat the lower cooking surface 32 and the well 36, the heater element 46 generally circumscribes the well leaving a small rear open segment for a power connection to the heater element. To insure the well 36 is adequately heated so that liquid contained within the well is vaporized during cooking, the heating element 46 is located in close proximity to the well and is preferably located between the well and peripheral rim 34. In an alternate embodiment, two or more heating elements may be provided to insure that the well 36 and the bottom cooking surface 32 are properly heated.

Referring to FIGS. 8 and 9, the upper unit 14 includes a downward opening dish-shaped upper housing 54. The upper unit 14 also includes an upper cooking plate indicated at 56 which is secured to the underside of the upper housing 54 by bolts 57 and a front peripheral lip 58 of the plate which is fixedly held in slot 59 formed in the upper housing.

Figure 10:
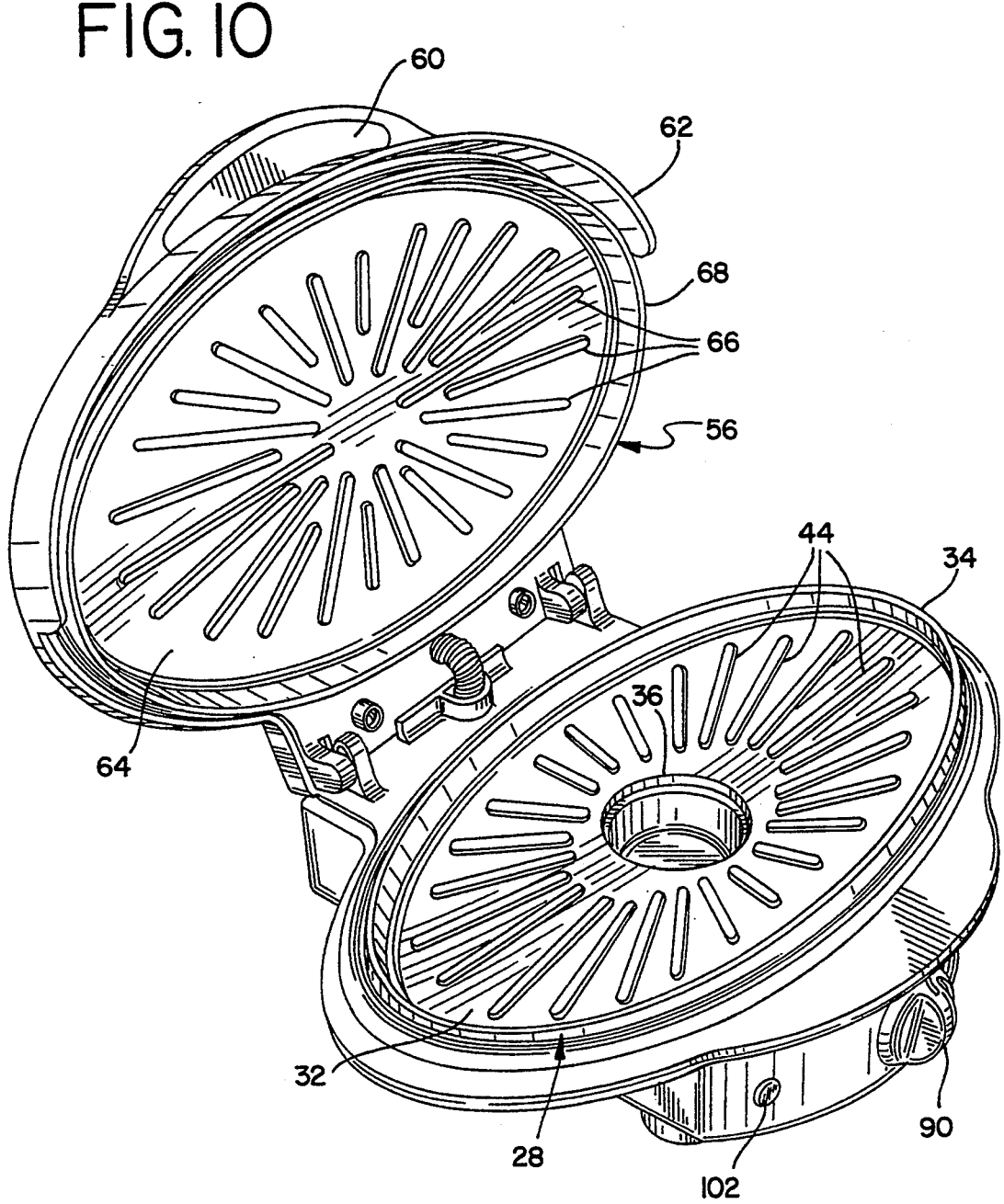
FIG. 10 is a perspective view of the device of FIG. 1 in an open position.

The upper cooking plate 56 includes a downward opening, generally concave upper cooking surface 64 having a plurality of radially extending ribs 66 (FIG. 10). The upper plate 56 includes an upper rim 68 which extends about the oval shaped periphery of the upper cooking surface 64. The upper rim 68 includes an inner sidewall 68a which is configured to conform to an outer sidewall 34a of the lower rim 34 so that when the cooker 10 is in a closed position 18b, the outer sidewall contacts the inner sidewall in a shingled type overlapping configuration as shown in FIG. 8.

The upper housing 54 includes a forward projecting flange 60 which facilitates manually operative pivotal movement of the upper unit 14, and a downwardly depending skirt 62 which extends in a semicircle about the frontal periphery of the upper housing. When the device 10 is in the closed position, the lower end of the skirt 22 is in close proximity to the lower housing 20 to shield the upper and lower plates 56 and 28 thereby preventing the user from inadvertently contacting the heated plates while operating the device 10.

The upper housing 54 and lower housing 20 are preferably made of a heat resistant plastic such as a thermosetting plastic. The upper plate 56 and lower plate 28 are preferably made of metal such as aluminum, steel or the like.

A tubular heating element 70 is provided to heat the upper cooking surface 64 by heating the upper plate 56. The heating element 70 is positioned to conductively transfer heat to the upper plate 56 by disposing the heating element in a channel 72 formed in an upwardly extending flange 74 integral with the upper surface 76 of the cooking plate 56. To provide efficient heat transfer from the heating element 70 to the flange 74 and upper plate 28, the channel 72 is configured to closely fit about a circumferential portion of the heating element. The heating element 70 is held within the channel 72 by deformation of the upper tips 74a of the flange 74 about a portion of the heating element. To evenly heat the upper cooking surface 64, the heating element 70 generally circumscribes the center of the upper cooking plate 56 leaving a small rear open segment for a power connection to the heating element.

Figure 5:
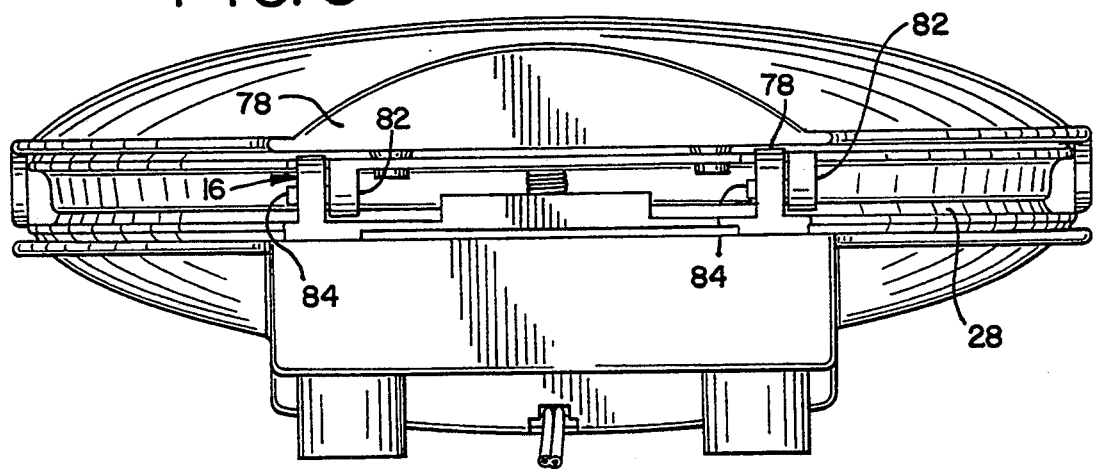
FIG. 5 is a rear elevation of the device of FIG. 1.
Figure 6:
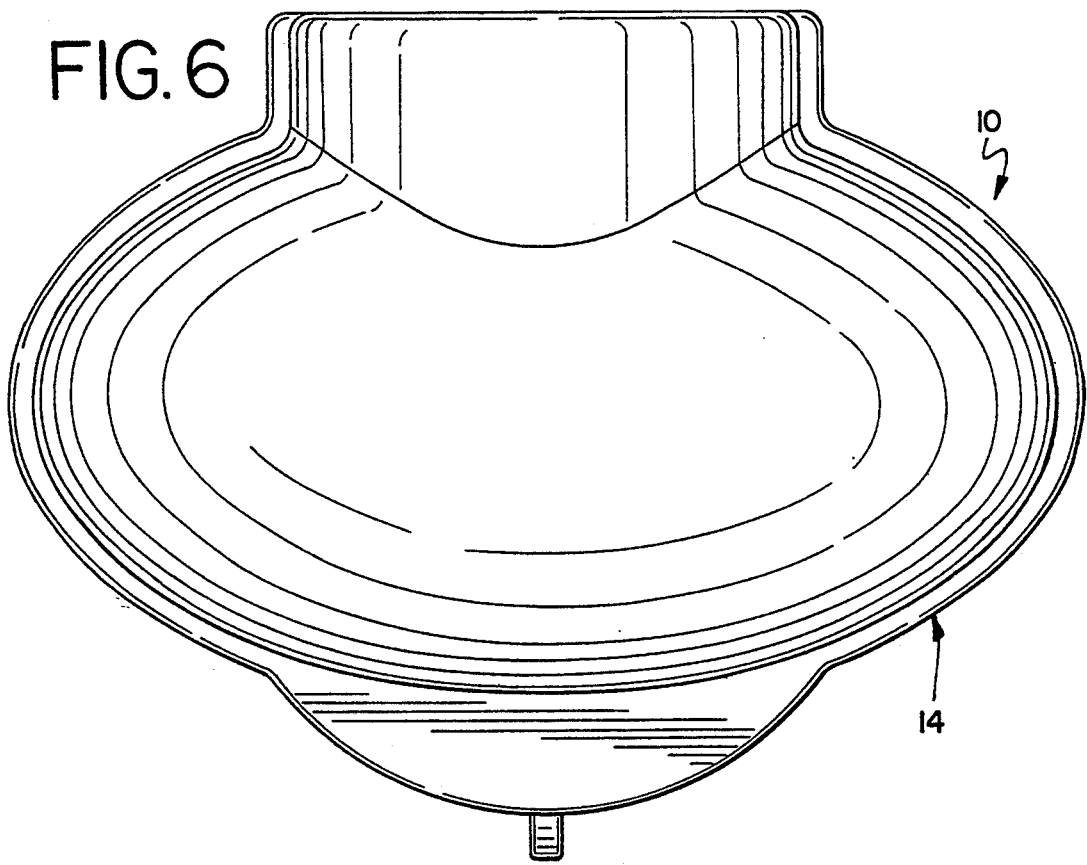
FIG. 6 is a top planar view of the device of FIG. 1.
Figure 7:
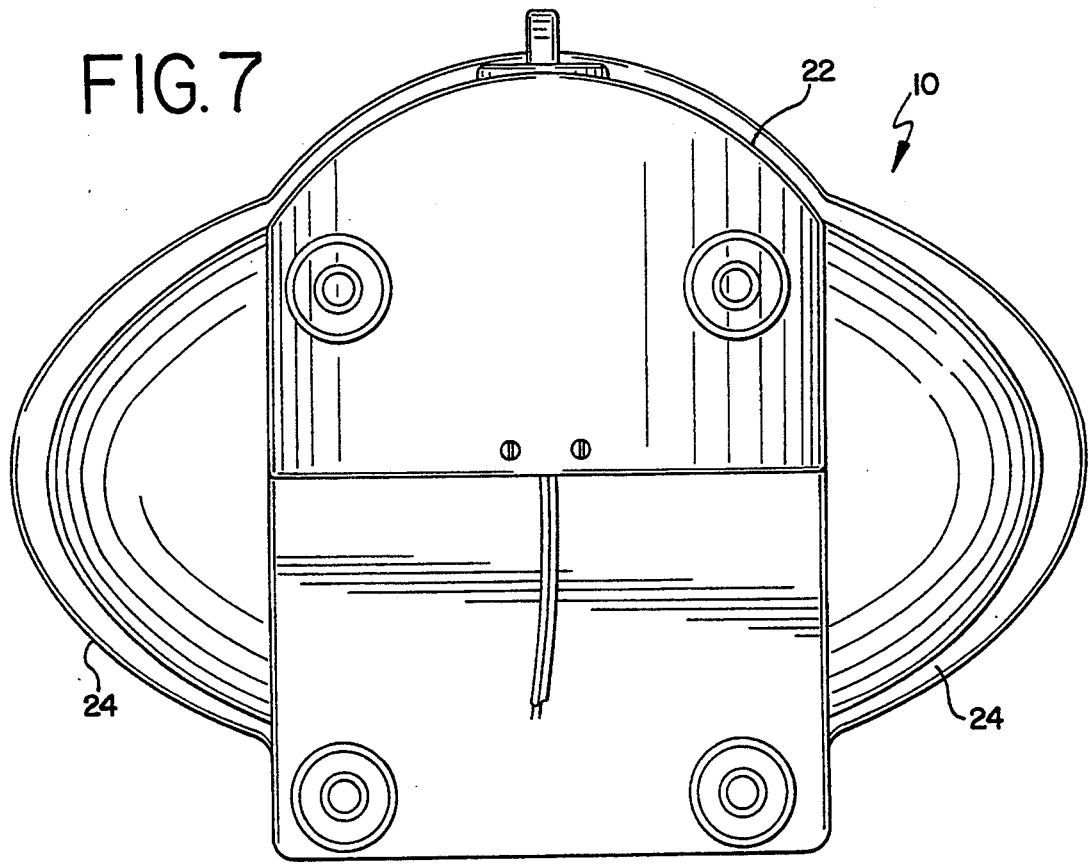
FIG. 7 is a bottom planar view of the device of FIG. 1.

Referring to FIGS. 3 and 5, the base unit 12 is pivotally connected to the upper unit 14 by the floating hinge 16. The floating hinge 16 includes a pair of laterally aligned vertically elongated guides 78 formed at the rear side of the lower cooking plate 28. Each of the guides 78 defines a slot 80. The upper cooking plate 56 forms a pair of vertically extending flanges 82 with each flange having a horizontally extending generally circular post 84. The flanges 82 and posts 84 are dimensioned so that the posts extend into the slots 80. The guides 78 allow guided vertical movement of the posts 84 within the slots 80.

Referring to FIG. 9, when the cooker 10 is in the closed position 18b, the lower plate 28 and upper plate 56 define a compact cooking chamber 86. The chamber 86 encloses the foodstuffs in the chamber and minimize the volume of the space within the chamber to which heat will be supplied, thereby reducing the energy and time required to properly cook the foodstuffs. The opposing concave shapes of the upper cooking surface 64 and lower cooking surface 32 focus the radiant heat given off by the upper plate 56 and lower plate 28 on the food being cooked so that heat is conducted into the foodstuffs from all sides which reduces the energy and time required for cooking.

The floating hinge 16 allows the relative vertical distance between the upper cooking surface 64 and the lower cooking surface 32 to vary so that the cooking chamber 86 can accommodate foods of varying thicknesses. The shingled overlapping configuration between the inner sidewall 68a of the upper rim 68 and outer sidewall 34a of the lower rim 34 maintains contact between the lower rim 34 and upper rim 68 even though the vertical position varies, thereby insuring the cooking chamber 86 remains substantially enclosed by the upper plate 56 and lower plate 28.

The shingled overlap between the upper rim 68 and lower rim 34 also functions to prevent hot grease from splattering from the cooking chamber 86 to the exterior environment. An additional function of the shingled overlap is to hinder the escape of steam from the cooking chamber 86 by forcing any steam created within the chamber to travel downward between the upper rim 68 and lower rim 34 before exiting from the cooker 10.

The controlled heating of the upper plate and lower plate is accomplished by the selective application of electrical power to the upper heating element 70 and lower heating element 46. The conductors of an electric cord, as commonly known, are terminated in junction block 88. One of the leads from the junction block 88 is connected to a dial timer control 90 disposed in the control cavity 26 and operable from the front face of the cooker 10. An outlet lead from an outlet terminal 92 of the control 90 is in turn connected to a click type thermostat 94 which is in heat exchange contact with a downwardly depending boss 96 formed by the lower plate 28. The thermostat is preferably set to maintain the temperature of the upper and lower cooking surfaces 64, 32 at about 185° C. The upper heating element 70 and lower heating element 46 are connected in parallel with the thermostat 94 and junction block 88 so that while the timer control 90 is actuated electric power will be controlledly supplied to the upper and lower heating element in dependence on the temperature of the lower cooking plate 28 as sensed by the thermostat.

To provide a conduit for conductors between the terminals of the upper heating element 70 and lower heating element 46, the cooker includes a spring sheath 98 vertically extending between the upper unit 14 and base unit 12 near the floating hinge 16. Also extending through the spring sheath 98 is a grounding wire 100 which is electrically connected to the upper and lower plates 56, 28.

An indicator light 102 disposed in the frontal face of the lower housing, is connected to the outlet 92 of the timer control 90 and junction block 88 to indicate when the timer control is on.

In operation, the cooker 10 is placed in the closed position 18b and the timer control 90 is actuated to preheat the upper cooking plate 56 and lower cooking plate 28 to the desired temperature.

The cooker 10 is then placed in the open position 18a. A measured amount of liquid containing flavor inducing components is placed into the well 36. The food to be cooked is placed on the ribs 44 on the lower cooking plate 28. The upper unit 14 is then pivotally moved to place the cooker 10 back into the closed position 18b. The timer control is then set for the desired cooking time, typically 4–8 minutes. The indicator light 102 indicates the cooker 10 is on.

During cooking, the compact cooking chamber 86 allows the heated upper cooking plate 56 and lower cooking plate 28 to be disposed in close proximity to the food so that heat transfer from the upper and lower cooking surfaces 64 and 32 into the food is very efficient thereby allowing the food to be quickly cooked. The ribs 66 on the upper plate 56 and ribs 44 on the lower plate 28 contact the food directly thereby transferring heat and creating grilling marks on the upper and lower surfaces of the food.

Also during cooking, the high temperature of the upper and lower cooking surfaces 64, 32 seals juices in the foodstuffs while the well 36, being heated by the lower heating element 46, causes the liquid disposed therein to boil and give off vapor containing flavor inducing components. The vapor fills the cooking chamber 86 and penetrates the food, contained therein, to moisten and flavor the food. The shingled overlapping configuration between the outer sidewall 34a of the lower rim 34 and inner sidewall 68a of the upper rim 68 will force any vapor trying to escape from the cooking chamber 86 to travel down between the two rims. This forcing of vapor downward between the upper and lower rims 64, 32 does not seal the cooking chamber 86 but acts to substantially restrain the vapor within the chamber. Cooking juices given off by the food during cooking drain into the well 36 and may be vaporized to add to the vapor present in the cooking chamber 86.

After the desired cooking time is expired, the timer control 90 interrupts current to the upper and lower heating elements 70, 46 and shuts off the indicator lamp 102 indicating the food has been cooked for the desired time. The cooker 10 is then placed in the open position 18a and the food is removed from the lower cooking plate 28.

A specific embodiment of the novel cooking device according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A device for cooking foodstuffs comprising:
   a first cooking plate;
   a second cooking plate movable relative to said first cooking plate to a closed position to form with said first plate a cooking chamber which substantially restrains the escape of vapor therefrom, said first plate having a first surface, a portion of said first surface contacting the food stuffs when said second plate is in said closed position, said first surface also forming well means for containing liquid; within said cooking chamber; and
   first heating means for supplying heat to said well means to vaporize at least a portion of the liquid in said well means to supply the vapor to said cooking chamber.

2. The device of claim 1 including
   hinge means fixedly attached to said first plate and said second plate for pivotal movement of said first plate relative to said second plate from an open position to said closed position.

3. The device of claim 2 wherein said hinge means includes means for varying the vertical position of said first plate relative to said second plate when said second plate is in said closed position.

4. The device of claim 1 wherein at least one of said first plate and said second plate includes means for substantially restraining the escape of vapor from said cooking chamber.

5. The device of claim 4 wherein said restraining means includes said first plate having a first peripheral rim and said second plate having a second peripheral rim, one of said first peripheral rim and said second peripheral rim being configured to fit about the other of said first peripheral rim and said second peripheral rim in a shingled overlap when the device is in said closed position.

6. The device of claim 5 wherein said first peripheral rim includes an outer sidewall and said second peripheral rim includes an outer sidewall, said outer sidewall configured to fit about said outer sidewall in said shingled overlap.

7. The device of claim 1 further including second heating means in conductive contact with said second plate for supplying heat to said first plate, said second heating means including means in conductive contact with said first plate for supplying heat to said first plate.

8. The device of claim 1 wherein said second plate forms a second surface opposing said first surface when said second plate is in the closed position, said first surface being curved and said well means being located at the lowest point of said first cooking plate whereby liquids contacting said first surface drain into said well means.

9. The device of claim 8 wherein said second surface is concave shaped and said well means is generally centrally located in said first plate.

10. The device of claim 2 further including a lower housing unit, said first cooking plate being attached to said lower housing; and
  an upper housing unit, said second plate being attached to said upper housing unit, said upper housing unit including a downwardly depending skirt extending about a portion of the front periphery of said upper housing unit, said skirt being configured so that when the device is in said closed position said skirt shields said first plate and said second plate from inadvertent contact therewith.

11. The device of claim 5 wherein said first plate forms said well means within said second peripheral rim.

12. A cooker for cooking foodstuffs comprising:
  a lower housing unit having a first cooking plate attached thereto;
  said first cooking plate having a first surface, a portion of said first surface contacting the foodstuffs during the cooking thereof, said first surface forming well means for containing liquid;
  said lower housing unit including first heating means in conductive contact with said first cooking plate for supplying heat to said first cooking plate and said well means to vaporize at least a portion of the liquid in said well means; and
  an upper housing unit having a second cooking plate attached thereto and movable relative to said lower housing unit and said first cooking plate to a closed position, wherein said first cooking plate and said second cooking plate form a cooking chamber which substantially restrains the escape of vapor therefrom, said well means containing the liquid within the cooking chamber.

13. The cooker of claim 12 including hinge means fixedly attached to said first plate and said second plate for pivotal movement of said second plate and said upper housing unit from an open position to said closed position.

14. The cooker of claim 13 wherein said hinge means includes means for varying the vertical position of said second cooking plate and said upper housing unit relative to said first cooking plate and said lower housing unit when said second cooking plate and said upper housing unit are in said closed position.

15. The cooker of claim 12 wherein at least one of said first cooking plate and said second cooking plate includes means for substantially restraining the escape of vapor from said cooking chamber.

16. The cooker of claim 15 wherein said restraining means includes said first cooking plate having a first peripheral rim and said second cooking plate having a second peripheral rim, one of said first peripheral rim and said second peripheral rim being configured to fit about the other of said first peripheral rim and said second peripheral rim in a shingled overlap when the cooker is in said closed position.

17. The cooker of claim 16 wherein said first peripheral rim includes an inner sidewall and said second peripheral rim includes an outer sidewall, said inner sidewall configured to fit about said outer sidewall in said shingled overlap.

18. The cooker of claim 12 further including second heating means in conductive contact with said second cooking plate for supplying heat to said second cooking plate, said first heating means including means in conductive contact with said first plate for supplying heat to said first plate.

19. The device of claim 12 wherein said first cooking plate forms a first curved cooking surface and said second cooking plate forms a second curved cooking surface and said well means being located at the lowest point of said first cooking plate whereby liquids contacting said first cooking surface drain into said well means.

20. The device of claim 19 wherein first cooking surface is concave shaped and said well means is generally centrally located in said first cooking plate.

21. The device of claim 12 wherein said upper housing unit includes a downwardly depending skirt extending about a portion of the front periphery of said upper housing unit, said skirt being configured so that when the device is in said closed position said skirt shields said first plate and said second plate from inadvertent contact therewith.

22. The cooker of claim 16 wherein said second peripheral rim includes an inner sidewall and said first peripheral rim includes an outer sidewall, said inner sidewall configured to fit about said outer sidewall in said shingled overlap.

* * * * *

UNITED STATES PATENT AND TRADEMARK OFFICE
CERTIFICATE OF CORRECTION

PATENT NO. : 5,363,748

DATED : November 15, 1994

INVENTOR(S) : Boehm et al.

It is certified that error appears in the above-identified patent and that said Letters Patent is hereby corrected as shown below:

Column 2, lines 16 and 18, at the end of each of the lines, insert as follows: --1;--.

Column 6, line 25, "liquid; within" should read --liquid within--.

Column 6, line 54, "rim includes an outer sidewall, said outer sidewall" should read --rim includes an inner sidewall, said inner sidewall--.

Column 6, line 59, "heat to said first plate, said second" should read --heat to said second plate, said first--.

Signed and Sealed this

Sixteenth Day of May, 1995

Attest:

BRUCE LEHMAN

*Attesting Officer*     *Commissioner of Patents and Trademarks*